F. J. NASH.
FERTILIZER AND THE MANUFACTURE THEREOF.
APPLICATION FILED FEB. 24, 1916.
1,228,587.
Patented June 5, 1917.
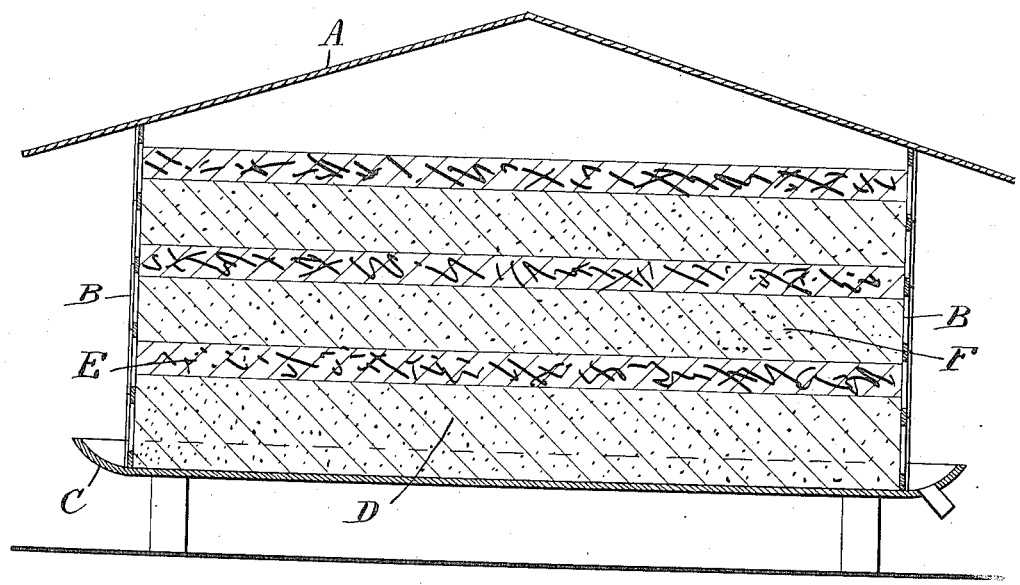
Frederic J. Nash Inventor
By his Attorneys
Sheffield & Betts

UNITED STATES PATENT OFFICE.

FREDERIC J. NASH, OF BROOKLYN, NEW YORK.

FERTILIZER AND THE MANUFACTURE THEREOF.

1,228,587.   Specification of Letters Patent.   Patented June 5, 1917.

Application filed February 24, 1916. Serial No. 80,097.

*To all whom it may concern:*

Be it known that I, FREDERIC J. NASH, a citizen of the United States, and a resident of the borough of Brooklyn, county of Kings, city and State of New York, have invented certain new and useful Improvements in Fertilizers and the Manufacture Thereof, of which the following is a specification, accompanied by drawings.

Up to within the nineteenth century, stable manure and compost made therefrom were practically the only fertilizers known and used. The problem of keeping up the crops with the diminishing amount of stable manure attracted the attention of chemists and the discovery of the use of mineral fertilizers was the result of this attention. But the use of these mineral fertilizers alone will cause a compacting of the surface soil which no tillage can remedy. This brings us to peat humus and green manure without the aid of at least one of which, mineral fertilizers cannot be made to act. The physical effects of peat humus or green manure upon the soil are to loosen up the soil and render it retentive of moisture. Also, they greatly increase the number of bacteria by the vast number of these organisms they bring with it, and by supplying appropriate food for those normally existing in the soil. We read on page 74, "*Soils*" by Hilgarde, that the only possible substitute for stable manure is found in green manuring with leguminous crops conjointly with the use of commercial mineral fertilizers.

Five different materials may be said to be absolutely necessary to put soil into its most effective shape:

(1) Nitrogen (2) phosphorus or phosphoric acid (3) potash (4) green manuring, and (5) the specific action of that much misunderstood, widely distributed, plentiful, but greatly underrated material, peat. Nature has provided vast beds of peat in temperate and northern latitudes, which consist of partially decayed matter in an antiseptic, cold, sour condition. These beds hold from 70 to 90 per cent. of water. In order to use peat, it must be taken out of its bed, made into a stack, preferably on a side hill, into which stack may be put heating manures as horse manure, poultry dung, human excrement, hog manure and lime. The excrement of cattle can also be added. When this stack has ripened, it is fit to apply to the land and be plowed under. A roof should be put on it to protect it from the addition of storm water. Peat is most exceedingly retentive of moisture, more so than any material known. In order to obtain the greatest retention of moisture in the soil and the greatest effect of lightening the soil, we should have not only humus, but the fibrous humus of peat.

Ocean vegetation on the other hand is the exact opposite of peat in many vital respects. It is cellular in construction, while peat is fibrous. Unite or combine them and perfection as a fertilizer is secured, the great instrument in the hands of man for the production of elemental wealth.

My method of uniting or combining them is as follows:

Peat after being dried, or dried and ripened in any suitable manner, is transported to a location near the ocean and the vegetation of the sea. A building is provided of appropriate size, preferably with open lattice work sides, and a roof, and a receptacular bottom, preferably of wood, in the shape of a cup or bowl. That is, preferably a flat floor with turned up sides. Upon this floor is deposited a layer of peat above described; upon that and in direct contact therewith is placed a layer of sea vegetation, fresh from the water, before it has lost its deliquescent potash, and so on, building up in alternate layers in direct contact over the dividing surface areas, until the stack is completed to the desired height. The sea-weed will lose its water rapidly and its potash with it; the peat will absorb and retain most of the potash. If any escapes, it will be held by the wooden trough whence the water containing it can be drawn off. Pure potash can be obtained by evaporating this water.

The drawing illustrates a house or shed A having open lattice work or grilled sides, and a floor C in the shape of a cup or bowl having a connection for drawing off the liquid which may collect in the bowl. First a layer of ripened peat D, which may be about three feet thick is placed on the bottom C, then a layer E of fresh sea-weed about one foot thick, then another layer of peat F about two feet thick and so on with alternate layers of sea-weed and peat, the layers of peat being, as stated, thicker than the layers of sea-weed in about the proportions set forth. The thickness of the layers and the dimensions of the stack may be varied as desired.

The total expense of obtaining the vegetation of the sea will be about twenty cents per ton for harvesting, and about as much more for putting it in the stack. The stack when dry enough can be taken out and put up in bales or placed in any suitable form of container and shipped anywhere to the place of use. This stack would be worth many times its cost as green manure to be plowed under, containing as it does fibrous material and soil lightener, even without the potash. After peat is treated as above described, the bacteria in the fertilizer fix or gather nitrogen from the air and the carbon dioxid produced by decomposition of the fertilizer acts upon the insoluble phosphates in the soil making them soluble. But it is essential that there be some phosphate in the soil from which soluble phosphate or phosphoric acid is produced, and in order to obtain this result the soil treated should contain some phosphates, since this is not true of all soils. Some varieties of the vegetation of the sea contain considerably more potash than do others.

The peat, furthermore, prevents the sea vegetation from ever becoming perfectly dry and the fertilizer made in accordance with my method, combines the advantages of the fibrous construction of peat with the cellular construction of sea vegetation. A potash fertilizer is produced of the kainit grade, while the sea vegetation in admixture therewith still retains its qualities as a green manure to be plowed under.

I claim and desire to obtain by Letters Patent the following:

1. The method of making a combined green manure and potash fertilizer, which consists in placing a layer of sea vegetation in substantially the condition in which it comes from the water before it has lost its deliquescent potash, upon and in direct contact with a layer of ripened peat, then permitting said layers to stand and dry out for a sufficient length of time to enable the layer of peat to absorb substantially all the drainage from the sea vegetation and retain the potash, and finally producing a humus forming mixture for useful purposes retaining the partially dried sea vegetation as a green manure in addition to the fertilizing constituents of the potash impregnated peat.

2. The method of making a combined green manure and potash fertilizer, which consists in forming a stack of suitable shape of alternate layers of ripened peat, and sea vegetation in substantially the condition in which it comes from the water before it has lost its deliquescent potash, beginning with peat as the bottom layer, each layer of one material being in direct contact with the next adjacent layer or layers of the other material throughout substantially the entire dividing surface contact areas, then permitting the stack to stand and dry out for a sufficient length of time to enable the layers of peat to absorb substantially all the drainage from the sea vegetation and retain the potash, and finally producing a humus forming mixture for useful purposes, retaining the partially dried sea vegetation as a green manure in addition to the fertilizing constituents of the potash impregnated peat.

3. The method of making a combined green manure and potash fertilizer, which consists in first placing a layer of ripened peat within a structure, then spreading over the layer of peat and in direct contact therewith over substantially its entire upper surface a layer of sea vegetation, in substantially the condition in which it comes from the water before it has lost its deliquescent potash, then permitting the said layers to stand and dry out in said structure, for a sufficient length of time to enable the layer of peat to absorb substantially all the drainage from the sea vegetation and retain the potash, and finally producing a humus forming mixture for useful purposes, retaining the partially dried sea vegetation as a green manure in addition to the fertilizing constituents of the potash impregnated peat.

4. The method of making a combined green manure and potash fertilizer, which consists in forming a stack of suitable shape of alternate layers of ripened peat, and sea vegetation in substantially the condition in which it comes from the water before it has lost its deliquescent potash, within a structure, the first layer being formed of peat, and each layer of one material being in direct contact with the next adjacent layer or layers of the other material throughout substantially the entire dividing surface contact areas, then permitting the stack to stand and dry out in said structure for a sufficient length of time to enable the layers of peat to absorb substantially all the drainage from the sea vegetation and retain the potash, and finally producing a humus forming mixture for useful purposes retaining the partially dried sea vegetation as a green manure in addition to the fertilizing constituents of the potash impregnated peat.

In testimony whereof I have signed this specification in the presence of two subscribing witnesses.

FREDERIC J. NASH.

Witnesses:
A. C. PARHAM,
HERBERT G. OGDEN.